Patented July 27, 1943

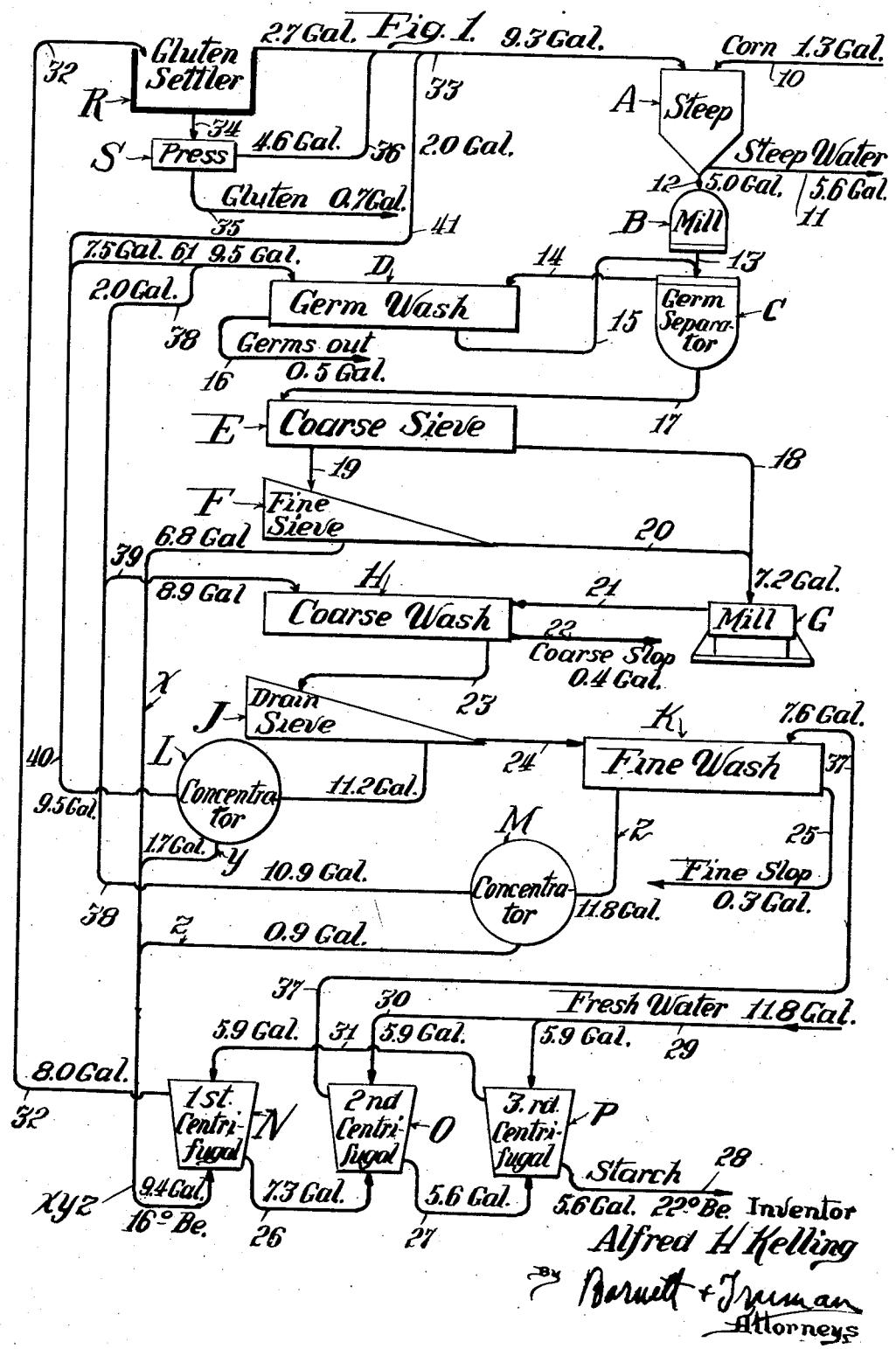

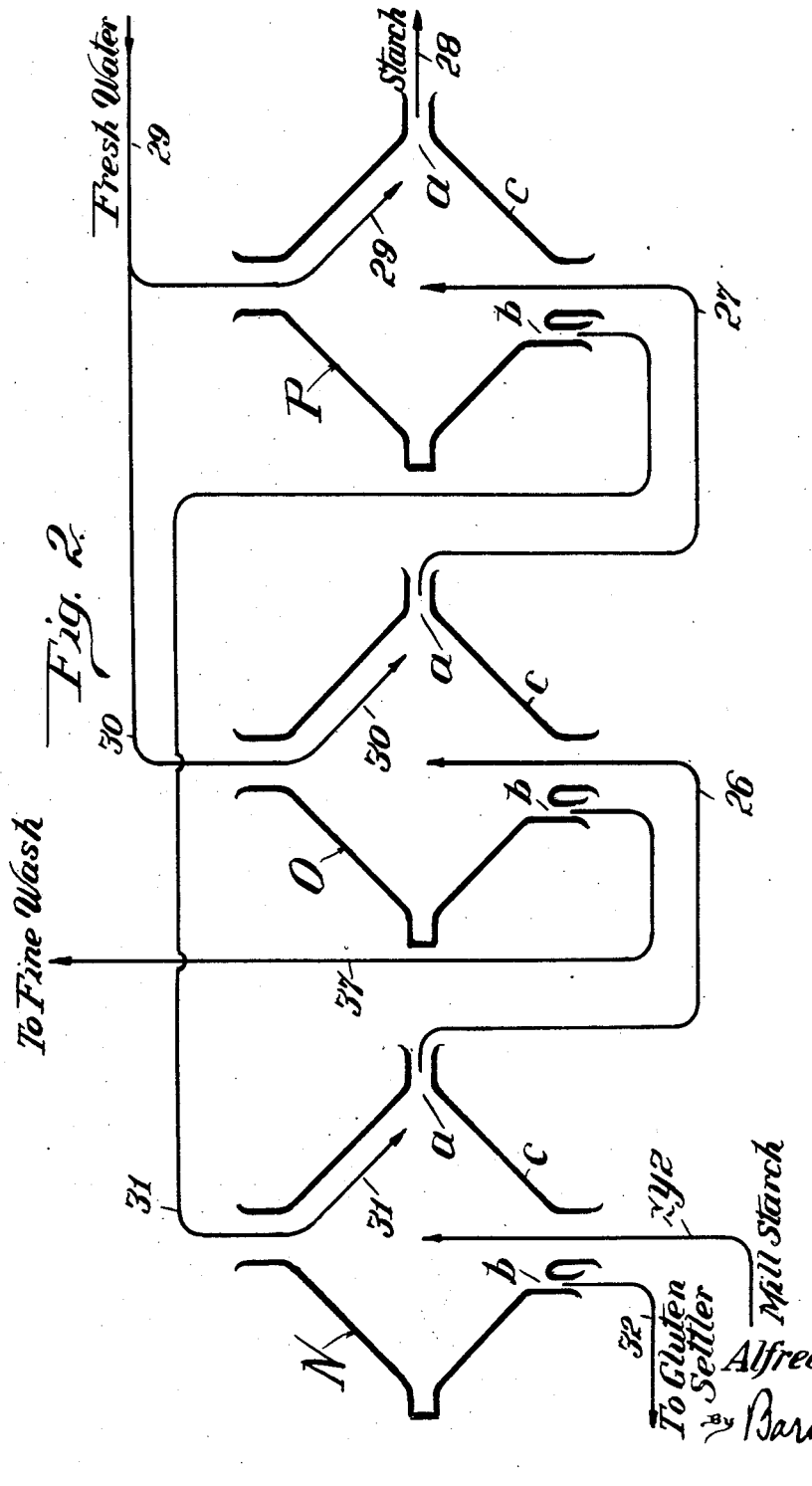

2,325,250

UNITED STATES PATENT OFFICE 2,325,250

MANUFACTURE OF STARCH

Alfred H. Kelling, Oak Park, Ill., assignor, by mesne assignments, to Corn Products Refining Company, New York, N. Y., a corporation of New Jersey Original application June 12, 1933, Serial No. 675,412. Divided and this application June 4, 1936, Serial No. 83,537

1 Claim. (Cl. 127—68)

This invention relates to the manufacture of starch from corn by the wet method; and particularly to a process in which all, or substantially all, of the process waters (except the steep water and the water absorbed in the discharged solids) are returned to the process for re-use, for the purpose of saving the solids, soluble and insoluble therein, and preventing the pollution of streams which results from discharging process waters from the factory.

In the manufacture of starch from corn it has been customary to steep the corn and withdraw the steep water to evaporators for recovery of the corn solubles contained therein. The steeped corn is then comminuted and subjected to separating operations in water for removal of the germs, hulls and fiber. The usual method has been to break up the corn coarsely, remove and wash the germs, grind the residue as finely as possible, and then subject the ground material to what is known as a coarse slop separating or washing operation in which gluten and starch are washed from the slop (hulls and fibrous part of the corn kernels) by passing the material through copper reels or over copper covered shakers. The mixture of starch, gluten and water from this operation is then passed through fine sieves to remove the residual slop particles which latter are then subjected to a fine slop separating or washing operation in a series of silk covered reels or on silk covered shakers for the purpose of washing out of the fine slop the starch and gluten which it contains. The mill starch (starch, gluten and water) from the germ, coarse slop and fine slop separating operations is then tabled, according to customary practice, for the purpose of removing the gluten from the starch. The starch removed from the starch tables, usually by flushing, is dewatered and washed with fresh water in washing filters. The gluten is allowed to settle in gluten settlers. The starch filtrate and wash water and the gluten settler water are returned to the process for re-use.

This application is a division of copending application Serial No. 675,412, filed June 12, 1933, in which are disclosed and claimed several alternative methods for effectively and conveniently separating the gluten from the starch by the use of centrifugals, one of which methods is described and specifically claimed herein.

The primary objects of the herein disclosed invention are first to provide a novel arrangement of the instrumentalities for carrying out the process whereby solubles may be completely eliminated from the starch by the centrifuging operation, or may be eliminated to a very large extent, so that the usual washing of the starch in filters may be dispensed with; and second to provide an arrangement whereby the starch and water magma delivered from the centrifugal system will be at a relatively high density so that it may be used directly, for example, in converting operations without further concentration.

The invention is illustrated in a preferred form in the accompanying drawings, wherein:

Fig. 1 is a flow-sheet diagram of the whole process; and

Fig. 2 is a more detailed diagram of the centrifugal system.

It will be understood that Fig. 1, for the purpose of simplification, shows units wherein practice there will be batteries, for example, of steep tanks, sieves, etc. The showing of machinery is purely diagrammatic. Any suitable apparatus may be used for carrying out the process steps illustrated.

The numerals in Fig. 1 of the drawings followed by the abbreviation "Gal." indicate the quantities of water present measured in gallons per bushel of corn ground. These figures are to be taken as illustrating a practical water balance. They might vary considerably for different installations. The aim is to re-use in the system all process waters except the steep water, evaporated for the purpose of saving solubles, and the relatively small quantities of water that go out of the system with the solids.

The process also involves, preferably, the concentration of the corn solubles including color substances, so far as possible, in one process water, that is in the gluten carrying overflow from the centrifugal system, and the reduction of the volume of this water to such an extent that all of it, or substantially all, may be returned to the steeps, whence it is discharged from the process. The rest of the process water, or waters, are re-used in the wet starch system, that is in the germ, coarse slop and fine slop separating operations. The gluten carrying overflow from the centrifugal system is ordinarily treated, for example in gluten settlers, for the removal of gluten before it is returned to the process for re-use. This settling operation is a more or less prolonged operation and is carried out at temperatures favorable to the development of micro-organisms. The water is, therefore, likely to be highly infected. The re-use of this water for steeping, however, presents no difficulties because the material treated in the steeping operation is unbroken corn, not very susceptible to contamination by soluble impurities including color substances or to bacterial action, and the steeping is carried out at relatively high temperatures and in the presence of considerable quantities of sulphur dioxide and these conditions tend to inhibit micro-organic activity. The separating operations, however, are carried on at lower temperatures, with less sulphur dioxide present and the material at these stages of the process is finely ground so as to be highly susceptible to contamination by solubles, color substances and to bacterial action. Consequently by useing exclusively for steeping the water which has remained longest in the process under conditions favoring bacterial action, and a process water which by the nature of the process contains the largest quantity of solids, and by eliminating from the other process waters soluble substances and concentrating these substances in the process water used for steeping, and then using the other process waters thus purified, for the wet starch system operations, as the present process contemplates, it is possible to obtain a purer starch. It is also possible to obtain a whiter color since the corn substances which tend to give a yellowish tinge to corn starch are, according to the present process, concentrated to a large extent in the overflow from the centrifugal system which is discharged from the system, in its entirety, through the steeps, without coming in contact with the finely divided material treated in the separating operations.

While the invention makes possible the return of all gluten settler water to the steeps, none of it going either to the sewer or to the wet starch system, nevertheless some advantage might be obtained from the arrangement constituting the present invention even if some small quantity of the gluten settler water were discharged to the sewer or used in the wet starch system, although neither expedient is necessary or desirable.

Referring first to Fig. 1: A designates the steeping system; B a mill in which the steeped corn is coarsely ground in order to free the germs; C a gravity separator for separating the germs from the rest of the comminuted material; D the apparatus for washing the germs; E a coarse sieve which receives the degerminated corn from the separator C; F a fine sieve for separating the starch, gluten and water mixture from the degerminated corn; G the mill for grinding the slop and grits from the coarse sieve E and fine sieve F; H the coarse slop washing apparatus for washing the ground materials from mill G; J a draining sieve through which the liquid from the coarse wash H is passed; K the fine wash apparatus for removing from the tailings of the drain sieve J the starch and gluten constrained therein; L a concentrator for extracting water from the mill starch coming from the coarse wash H through the drain sieve J; M a concentrator for extracting water from the mill starch from the fine wash K; and N, O and P a series of centrifugal machines for removing gluten and solubles from the mill starch derived from the separating operations. A larger number of centrifugals might be employed.

The conduits between the above enumerated instrumentalities (referred to as pipes although they may in some cases be troughs, conveyors or other conducting means) will be referred to in connection with the description of the operation of the system which is as follows:

Operation of process: The corn containing 1.3 gallons of water enters the steeping system A at 10. From the steeping system 5.6 gallons of steep water are withdrawn through pipe 11 to the evaporators (not shown) where this water is evaporated to a sufficient extent to mix, for example, with the slops and gluten in the manufacture of cattle food. In this, or other suitable ways, the corn solubles, which are to a large extent leached out of the corn in the steeping operation are saved together with the solubles returned to the steeps in the process water from the centrifugal system.

The steeped corn with 5.0 gallons of water passes through pipe 12 to the mill B where it is coarsely ground. The ground material passes through pipe 13 to the germ separator C from which the germs are floated off, passing through pipe 14 to the germ washing system D. Starch milk passes from the germ wash through pipe 15 back to the separator C for supplying liquid of the necessary gravity for effecting a separation as between the germs and the rest of the corn. The washed germs are discharged from the germ washing system D at 16 with 0.5 gallon of water. The degerminated corn is discharged from the separator C through pipe 17 to coarse sieve E. The tailings from the coarse sieve E pass through pipe 18 to mill G. The starch milk from coarse sieve E passes through pipe 19 to fine sieve F, the tailings, or grits, from which pass through pipe 20 to the mill G. The combined streams 18 and 20 going to the mill carry 7.2 gallons of water. The mill starch (starch gluten and water) passing through the fine sieve F goes into a pipe designated $x$ leading to the centrifugal system. This stream carries 6.8 gallons of water together with starch, gluten solubles and suspension colloid substances and is practically free of all bran and fiber. The grits and slop entering mill G are there ground as finely as possible and the ground material is conducted through pipe 21 to the coarse slop washing system H consisting, ordinarily, of copper reels or shakers, through which the material is passed successively. The coarse slop containing 0.4 gallon of water is discharged from the system at 22. The bulk of the water, starch and gluten, with some fine slop particles, from the coarse wash passes through pipe 23 to the drain sieve J. The tailings from this sieve pass through the pipe 24 to the fine wash system K which consists, ordinarily, of reels or shakers covered with bolting cloth. The fine slop, containing 0.3 gallon of water is discharged from the system at 25.

The mill starch from the coarse wash, after being freed of fine slop by the drain sieve J, passes through pipe $y$ to the concentrator L, which may be a settling tank but is preferably a filter, the amount being 11.2 gallons from which 9.5 gallons of water is extracted, leaving 1.7 gallons in the concentrated material which passes through the other branch of pipe $y$ to the pipe $x$ and thence to the centrifugal system.

The mill starch from the fine slop wash K passes through pipe $z$ to the concentrator M, the amount being 11.8 gallons from which 10.9 gallons of water is extracted, the concentrated starch, containing 0.9 gallon of water passing through the other branch of pipe $z$ to the pipe $x$ and thence to the centrifugal system.

The mill starch from the three separating operations, 9.4 gallons, with a density of about 16° Baumé, enters the first centrifugal N through pipe $xyz$. The underflow (principally starch) from the centrifugal N, 7.3 gallons, passes through pipe 26 to the centrifugal O; and the underflow from centrifugal O, 5.6 gallons, passes through pipe 27 to the centrifugal P. The underflow from centrifugal P, 5.6 gallons, with a density of about 22° Baumé—a density suitable for conversion purposes—is discharged from the starch making system through pipe 28. Fresh water, 5.9 gallons, enters the third centrifugal through pipe 29 and the same amount of fresh water goes to the centrifugal O through the branch pipe 30. The overflow from the centrifugal P by-passes the second centrifugal O and enters the first centrifugal N through pipe 31, the amount being 5.9 gallons. The purpose of this is to prevent re-cycling of the solubles within the centrifugal system which necessarily occurs if the centrifugals are arranged in the usual counter-current arrangement. That is a certain quantity of the solubles in the overflow, if the overflow passes from each centrifugal to the next one in advance, will be carried in the other direction with the underflow current, thus interfering with the desired concentration of solubles in the first centrifugal.

It will be seen that the same principle of avoiding internal circuits is applied to the circulation of reused process waters through the separating operations, which will be described hereafter.

Reverting to the centrifuging system, the wash water is introduced into the third and second centrifugals in the underflow zones of said centrifugals; and, similarly, the overflow from centrifugal P enters the starch or underflow zone of the first centrifugal N. As a result the solubles are concentrated in the overflow zone of each centrifugal and ultimately are collected in a highly concentrated state in the overflow from the first centrifugal N. This effect is due in part to dilution but, apparently, in part also to displacement, since actual experiments have shown that the concentration of solubles in the overflow is considerably greater than can be accounted for mathematically on the principle of dilution. The entering starch milk, high in solubles, has split off from it a portion of its water which is replaced by a wash water having a relatively low solubles content.

This method of centrifuging is illustrated in Fig. 2. The fresh water introduced from pipes 29 and 30 into the centrifugals P and O, respectively, and the overflow from centrifugal P introduced through pipe 31 into centrifugal N enter the centrifugals at the underflow zone, that is near the point of discharge of the underflow; these zones being indicated by $a$ on the drawings, the points of discharge of the gluten and water from the overflow zone being indicated at $b$. The rotating body of the centrifugal machine, which may be of any suitable construction being designated $c$.

The process waters are preferably re-introduced into the process in the following manner: The overflow from the first centrifugal N, 8.0 gallons, containing all of the gluten and all the soluble substances taken from the mill starch, passes through pipe 32 to a gluten settler R the water from which, 2.7 gallons, passes through pipe 33 to the steeping system A. The gluten from the settler passes through pipe 34 to a press S from which the gluten with 0.7 gallon of water is discharged at 35. The water from the press, 4.6 gallons, goes to the steeps through pipes 36, 33.

By this arrangement substantially all the solubles including yellow color substances leached out of the corn material in the process steps following the steeping of the corn, together with most of the micro-organisms developed in the process, and the products of micro-organic activity coming from the separating operations find their exit from the system through the steeps without going back into the separating operations at all. When this is done, the germ, coarse slop and fine slop separating operations will be substantially free from colored matter and from the types of micro-organisms which tend to produce suspension colloids difficult if not impossible to remove from the starch by washing or other known means, and to a very large extent free from all solubles of a contaminating character.

The overflow from the second centrifugal O, which contains a relatively small quantity of solubles, is returned through pipe 37 to the fine wash K, the amount being 7.6 gallons.

The water extracted from the fine slop starch milk by the concentrator M, the amount being 10.9 gallons, passes into pipe 38, 2.0 gallons going to germ wash D and 8.9 gallons through pipe 39 to the coarse slop wash H. This water contains a larger quantity of solubles than the overflow from the second centrifugal, but the quantity is relatively small since the mill starch from the fine wash is low in solubles.

The water extracted from the coarse slop mill starch by the concentrator L, 9.5 gallons, enters pipe 40, 7.5 gallons going to the germ wash and 2.0 gallons through pipe 41 to the pipe 33 leading to the steeps; the amount of steep water being in all 9.3 gallons. Because of the high concentration of the mill starch sent to the centrifugal system the water in the overflow from the centrifugal system is insufficient for steeping the corn and the deficiency is made up in this way. This means that a large quantity of fresh water can be introduced into the centrifugal system which is desirable where, as in this case, the centrifugal system is intended to function not only to remove gluten but to extract solubles from the mill starch to such an extent that the usual washing of the starch in filters may be dispensed with.

It will be observed that in the separating operations there are no internal cycles. None of the water from either the coarse slop washing system or the fine slop washing system is returned to that system in either case. As a result there is no chance for any portion of the process waters to become old, and hence to develop infection, through repeated use which will necessarily occur, to some extent, when process waters are re-cycled through the system in internal cycles.

The concentration of the mill starch is an important feature of the process. The combined mill starch streams from germ, coarse slop and fine slop separations will ordinarily have a density of 5° to 7° Baumé. The concentration of the mill starch, before centrifuging, to 16° Baumé, as shown, very considerably reduces the amount of centrifugal equipment required; and centrifugal machines are relatively expensive and costly to operate and maintain. Moreover the operation of centrifuging the mill starch is facilitated by increasing its density. The denser liquor can be held in the centrifugal machine long enough to permit the separation of the gluten from the starch by centrifugal force without making the discharge orifices so small as to be liable to clogging.

No claim is made here to the inventions common to this application and the other forms disclosed in application Serial No. 675,412 of which this application is a division since the generic inventions are covered in the parent case and other forms being claimed specifically in other divisional applications. However, it is the intention herein to cover by patent all applications of the described process to industries other than the starch making industry and all modifications of the herein disclosed invention within the scope of the appended claim.

I claim:

In the manufacture of starch from corn, the method of separating gluten from starch which consists in subjecting the mill starch to a series of centrifugal operations in which the underflow moves from centrifugal to centrifugal in one direction and the overflow in the other; diminishing the underflow in proportion to overflow from centrifugal to centrifugal so as to increase the density of the starch liquor delivered from the system; supplying fresh water to the last two centrifuging operations; and causing the overflow from the last centrifuging operation to by-pass the next operation in advance and enter the operation further in advance in the series.

ALFRED H. KELLING.

CERTIFICATE OF CORRECTION.

Patent No. 2,325,250.                                                July 27, 1943.

ALFRED H. KELLING.

It is hereby certified that error appears in the printed specification of the above numbered patent requiring correction as follows: Page 2, first column, line 58, for "constrained" read --contained--; and that the said Letters Patent should be read with this correction therein that the same may conform to the record of the case in the Patent Office.

Signed and sealed this 14th day of September, A. D. 1943.

(Seal)
                                           Henry Van Arsdale,
                                     Acting Commissioner of Patents.